United States Patent [19]
Rodrigues et al.

[11] Patent Number: 5,519,286
[45] Date of Patent: May 21, 1996

[54] ELECTRONIC BALLAST WITH BUILT-IN TIMES POWER SAVER AND PHOTOELECTRIC SWITCHING FOR HIGH-PRESSURE MERCURY VAPOR, METALLIC VAPOR AND SODIUM VAPOR LAMPS

[76] Inventors: Horacio S. Rodrigues; Renato Rodrigues; Antonio N. Rodrigues, all of Mateus Leme, 2926, Parana Curitiba, Brazil

[21] Appl. No.: 189,983

[22] Filed: Feb. 1, 1994

[30] Foreign Application Priority Data

Feb. 1, 1993 [BR] Brazil ..................................... 9300480

[51] Int. Cl.$^6$ ..................................... H05B 37/02
[52] U.S. Cl. .......................... 315/159; 315/307; 315/360; 315/247; 315/DIG. 7; 315/DIG. 5
[58] Field of Search .................... 315/156, 159, 315/158, 307, 247, 291, 209 R, 219, 224, 244, DIG. 5, DIG. 7, 360, DIG. 4

[56] References Cited

U.S. PATENT DOCUMENTS 4,277,728  7/1981  Stevens .............. 315/DIG. 7

*Primary Examiner*—Robert Pascal
*Assistant Examiner*—Michael Shingleton
*Attorney, Agent, or Firm*—Kuhn and Muller

[57] ABSTRACT

An electronic ballast is provided with a built-in timed electric power saver and with photoelectric switching for high-pressure mercury vapor, metallic vapor and sodium vapor lamps. The electronic ballast with the built-in timed saver and photoelectric switching for high-pressure mercury vapor, metallic vapor and sodium lamps includes an electronic circuit having as a principle the obtaining of an increase in the frequency of the electric power distribution network. This increase is accomplished by means of a switching that results in a current limiting electronic device, which also is able to incorporate a timed electric power saver, the utilization of a single equipment for various lamp lower ratings, a photo-sensitive element for control of the lamp switching in accordance with the lighting level of the installation site and an ignitor for lamps requiring a voltage higher than the rated one.

3 Claims, 1 Drawing Sheet

ELECTRONIC BALLAST WITH BUILT-IN TIMES POWER SAVER AND PHOTOELECTRIC SWITCHING FOR HIGH-PRESSURE MERCURY VAPOR, METALLIC VAPOR AND SODIUM VAPOR LAMPS

FIELD OF THE INVENTION

The present invention relates to an equipment employed for lighting in general, more specifically to a ballast, made with electronic components employed for use in connection with the operation of high-pressure mercury vapor, metallic vapor and sodium vapor type lamps.

BACKGROUND OF THE INVENTION

The current conventional prior art ballasts employed on the aforementioned high pressure mercury vapor, metallic vapor and sodium vapor lamps are of the inductive electric type, the disadvantage of which is a heavy high weight by reason of their construction and system.

OBJECTS OF THE INVENTION

One of the objects of the present invention is to reduce the weight thereof in relation to the weight of conventional prior art ballasts.

In addition to the application as a current limiter for high pressure mercury vapor, metallic multiple vapors and sodium discharge lamps, the technology of the present invention allows for the utilization of the ballast as a timed electric power saver, the utilization of a single type of equipment for various lamp ratings and, by incorporation of a photo-sensitive element and lamp switching, the control according to the lighting level of the installation site.

Another advantage arising from the utilization of the electronic device of the present invention is that it does not require the use of capacitors to correct the power factor, due to the low inductance inherent to the circuit. In the case of lamps requiring ignition at a voltage exceeding the rated one, such as those employing metallic multivapors and sodium, the electronic ballast of the present invention contains the ignitor incorporated within and to the circuit thereof.

SUMMARY OF THE INVENTION

The present invention therefore includes an electronic ballast with a built in timed saver and photo-electric switching for high pressure mercury vapor, metallic vapor and sodium lamps. The ballast includes an electronic circuit for obtaining an increase in the frequency of an electric power distribution network, by means of a switching that results in a current limiting electronic device. The ballast is also able to incorporate a timed electric power saver, the utilization of a single equipment ballast for various lamp power ratings, a photo-sensitive element for control of the lamp switching in accordance with the lighting level of a particular installation site and an ignitor for lamps requiring a voltage higher than the rated one.

DESCRIPTION OF THE DRAWING

The objectives, advantages and other important features may be more easily understood when read jointly with the appended drawing, wherein.

DETAILED DESCRIPTION OF THE PREFERRED EMBODIMENT

Figure 1:
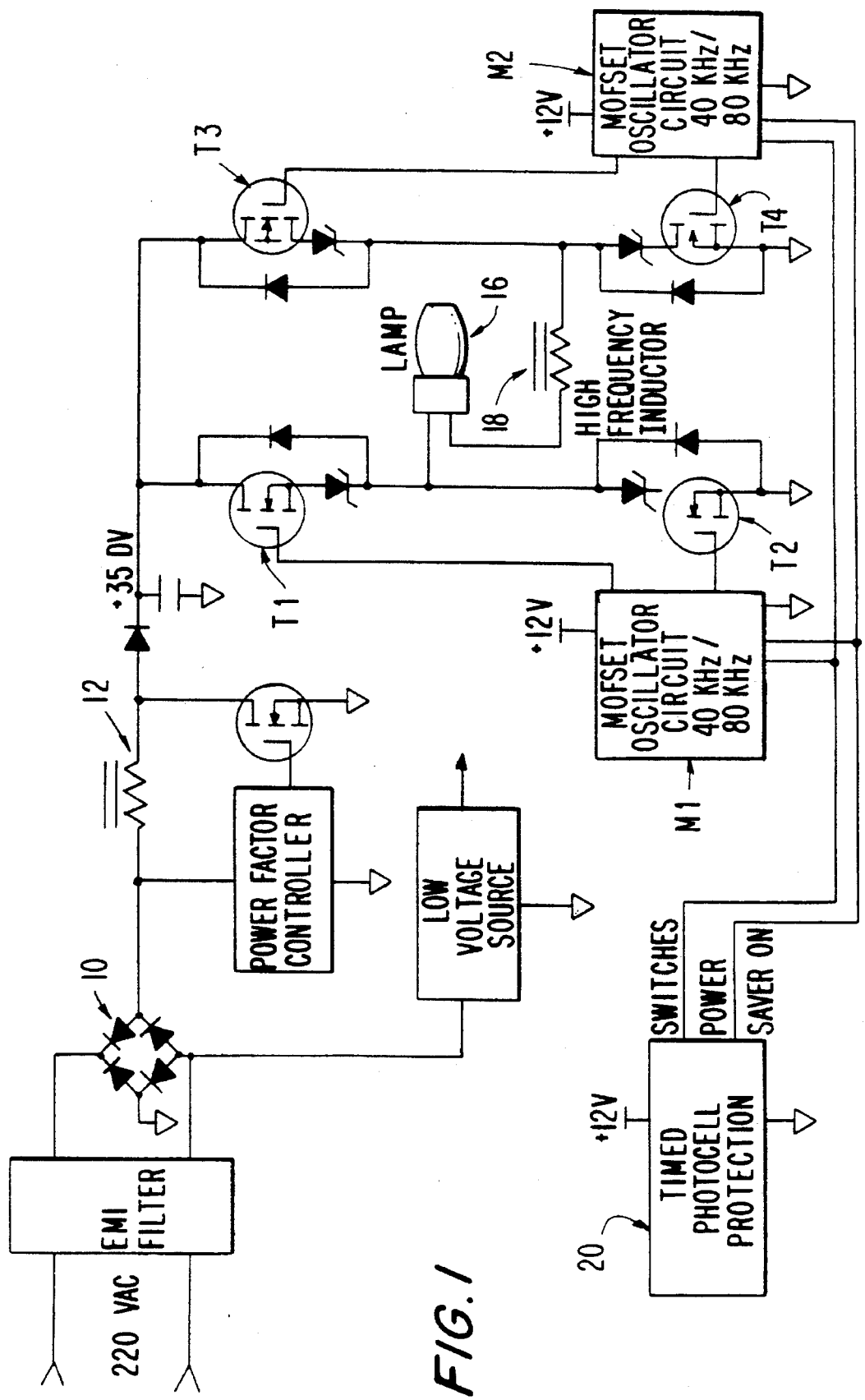
FIG. 1 shows the electronic circuit of the electronic ballast of the present invention in question.

As can be seen and inferred from the annexed drawing FIG. 1, it illustrates and is an integral part of the description of the present invention for an electronic ballast for high-pressure mercury vapor, metallic vapor and sodium vapor lamps.

As shown in FIG. 1, the ballast includes an electronic circuit having as a principle function the obtaining of a a first or second predetermined frequency higher than a third predetermined conventional frequency of 50 Hz or 60 Hz of the electric power line used in conjunction with the ballast, by means of electronic switching, which results in a current limiting electronic device.

In order to perform the electronic switching, an oscillator is employed that uses the electric power network voltage itself, the purpose of which is the switching of the power transistors. The resulting switched square wave requires a low inductance for lighting current, contrary to the conventional prior art ballasts that employ high inductance at a low frequency, which imposes large dimensions and mass upon the ballast.

In the present invention, the eventual noise introduced in the network is eliminated by means of an appropriate filter.

In contrast to the ballast of the present invention, conventional ballasts currently employed for current and voltage lighting for use in connection with high-pressure discharge lamps such as those of mercury, sodium vapor and metallic multiple vapors, include an inductor having a pre-established resistance, that depends on the lamp's rating. The main drawbacks to conventional ballasts thereof are the excessive weight, its own consumption of power, namely, about 10% of the lamp's rate power, and the need for associating a high-capacitance capacitor to correct the power factor, from about 0.57 to 0.85, plus the necessity of a photoelectric relay and ignitors, in the cases of sodium and metallic multiple vapor lamps.

By reason of the countless auxiliary equipment, the lighting fixtures using conventional ballasts must be provided with an ample lodging space, i.e. a neck, and must be made of reinforced material, which by itself represents an increase in the mass and weight to be supported by the lighting fixture's support arm and the post of the electric power distribution network.

In the case of a prior art installation located externally to the lighting fixture, the equipment is bulky, poorly weather-resistant and requires sturdy post attachment devices. In addition, it is limited to allowing the lamp to switch on, and causing a flicker. A large portion of the power loss occurs due to the Joule effect, with transformation of electric power into heat.

In addition, even though the electric power utilities have by themselves established standard ballasts, due to the diversity in the construction of ballasts, there are several shapes and performances for ballasts of the same power. Therefore this causes the lamps to present different luminous flows and very often the lives thereof are significantly shortened.

As shown in FIG. 1, in connection with the ballasts of the present invention, the updating of the ECO-1 Chip, which incorporates the electronic switching, timer, protection and photoelectric switching circuit, associated with the board's power circuit, provides safety, durability, consistent performance and an extreme light weight to the ballast of the present invention.

As further shown in FIG. 1, the ballast includes properly dimensioned filters, which are used and are sufficient to eliminate RF and EMI noises. The power factor associated with use of the ballast of the present invention is ensured to a value very close to one.

As also shown in FIG. 1, bridge rectifier 10 provides a dc voltage on rail 12 from the 220 volts ac supply. Gas discharge lamp 16 is connected in series with inductance coil 18 in the cross-member of an H-configuration circuit which is connected between rail 12 and a ground: MOFSET transitor switches T1, T2, T3, T4 are connected in the four legs of the "H". Respective oscillators in MOFSET oscillator circuits M1, M2 pass pulses to the transistor switches so that, alternately, T1 and T4 are conducting (with T2 and T3 non-conducting) and then T2 and T3 are conducting (with T1 and T4 non-conducting). When T1 and T4 are conducting, current passes through the lamp 16 and coil 18 from left-to-right, as viewed in the drawing FIG. 1 and conversely when T2 and T3 are conducting, current passes through lamp 16 and coil 18 in the opposite direction. The frequency of these pulses, which control the transistor switches, is substantially higher than the frequency of the ac supply.

Timed power saver 20 uses both an internal timer and a photocell to switch the lamp on and off at predetermined times and to select full power or a power saver mode as a function of ambient light conditions.

The following examples are associated with the use of the electronic ballast of the present invention.

2.1 FIRST PROFILE

NORM. = 100%
ECON. = 60%

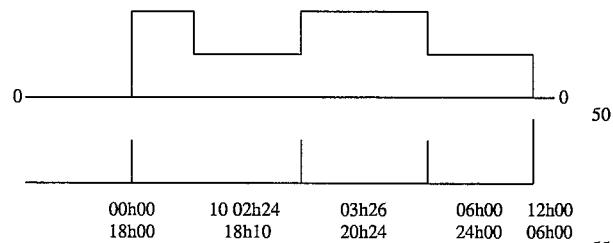

| | 00h00 | 10 02h24 | 03h26 | 06h00 | 12h00 |
| | 18h00 | 18h10 | 20h24 | 24h00 | 06h00 |

| EVENT | TIME | LAMP OPERATION |
|---|---|---|
| SUNDOWN | 0 MINUTES | IGNITION |
| STABILIZATION | UP TO 10 MINUTES | FULL POWER |
| PEAK REDUCTION | UP TO 02h24 | ECONOMY MODE |
| NORMAL OPERAT. | UP TO 03h26 | FULL POWER |
| PREDAWN | 06H00 ONWARDS | ECONOMY MODE |
| DAWN | SUNRISE + 10 MIN. | ECONOMY MODE |
| AFTER DAWN | ONWARDS | SWITCHED OF |

2.2 SECOND PROFILE

NORM. = 100%
ECON. = 60%

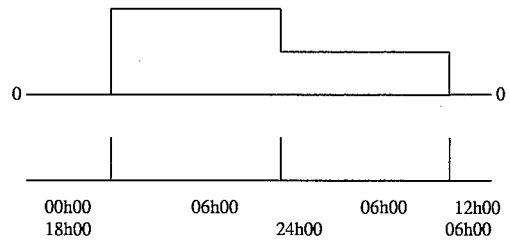

| | 00h00 | 06h00 | | 06h00 | 12h00 |
| | 18h00 | | 24h00 | | 06h00 |

| EVENT | TIME | LAMP OPERATION |
|---|---|---|
| SUNDOWN | 0 MINUTES | IGNITION |
| NORMAL OPERAT. | UP TO 06h00 | FULL POWER |
| PREDAWN | 06h00 ONWARDS | ECONOMY MODE |
| DAWN | SUNRISE + 10 MIN. | ECONOMY MODE |
| AFTER DAWN | ONWARDS | SWITCHED OFF |

2.3 THIRD PROFILE

NORM. = 100%

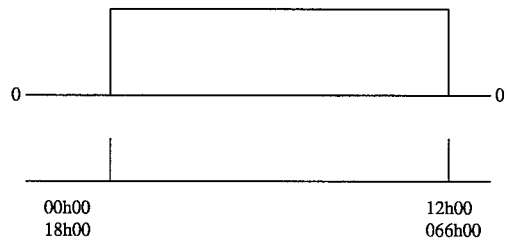

| | 00h00 | 12h00 |
| | 18h00 | 066h00 |

| EVENT | TIME | LAMP OPERATION |
|---|---|---|
| SUNDOWN | 0 MINUTES | IGNITION |
| NORMAL OPERAT. | UP TO 12h00 | FULL POWER |
| AFTER DAWN | ONWARDS | SWITCHED OFF |

The advantages of the electronic ballast of the present invention, which includes a built-in timed power saver and photoelectric switching, namely, REET, in relation to conventional prior art ballasts are as follows:

1. The electronic ballast of the present invention achieves a 10% economy in the normal operation regime;
2. The electronic ballast causes the saving of power at electric power peak utilization hours, by means of a timer adjusted to the convenient time schedules of the electric power utility;
3. The total mass and weight of the equipment of the ballast of the present invention is considerably less than that of the conventional prior art ballast, in spite of the fact that the former incorporates other auxiliary equipment, which allows the use of lightweight lighting fixtures and support arms having a smaller span;
4. In connection with the ballast of the present invention, the luminous flow from the lamp is practically equal to the power consumed, due to the negligible losses in the equipment;
5. The operating temperature is the same as the ambient temperature;

6. The size volume of the equipment of the ballast is minimal;
7. The electronic ballast of the present invention is more reliable, since the ballast uses high-technology equipment;
8. The ballast of the present invention results in the absence of audible and RF/MI noises;
9. The ballast is packaged in fiberglass or high-impact PVC boxes, which provides resistance to the weather and hostile environments;
10. The ballast does not employ moving parts prone to a quick wear and tear, or to accidental misadjustment;
11. The use of the ballast of the provides a protection against voltage and current surges;
12. The ballast and associated equipment are integrated in a single device, with all auxiliary equipment indispensable for the proper operation of the lamp economy, including timed switching, natural light switching, an ignitor in the cases of sodium and metallic multiple vapor lamps, and a capacitor for power factor correction;
13. The use of the ballast of the present invention results in lower lighting fixture cost, by reason of construction material savings and a better design configuration;
14. Use of the ballast results in lower cost of the lighting fixture support arm;
15. The ballast may be installed internally or externally to the lighting fixture;
16. The ballast has a low cost, namely, a lower cost than the sum of the costs of using conventional ballast equipment;
17. Use of the ballast also results in consistent quality, due to serial and large-scale manufacture of the ballast;
18. The ballast provides durability equal to or higher than that associated with use of conventional ballast;
19. The possibility of repairs are minimized.

It is noted that the ballast of the present invention is not limited to the specific embodiments described in the text and drawings herein, but rather instead, various modifications may be made to the present invention without departing from the scope of the present invention, as noted in the appended claims.

We claim:

1. An electronic ballast for high-pressure mercury vapor, metallic vapor and sodium vapor lamps, comprising an electronic circuit for producing and obtaining a high frequency of 40 KHz to 80 KHz instead of the frequency associated with that of an electric power distribution network, said ballast further including a current-limiting electronic device which said current-limiting electronic device, to perform electronic switching, employs an oscillator powered by the electric power network, the purpose of which said oscillator being to switch the power transistors, wherein the resulting square switched waveform requires a low inductance for current limitation, contrary to conventional ballasts which employ high inductance and low frequency, said ballast having a smaller mass, weight and dimension than that of conventional ballasts, said ballast further including a photocell, said photocell controlling the function of turning on or turning off the lamp at sundown or sunrise, said power saver being controlled by means of a timer, said power saver responsive to the function of switching to a saver mode and commuting the frequency of a MOFSET oscillator circuit from 40 KHz to 80 KHz.

2. The electronic ballast for high-pressure mercury vapor, metallic vapor and sodium vapor lamps, as in claim 1, wherein the lamps utilize said ballast as a timed electric power saver, said ballast being an interchangeable single equipment for utilization with lamps of various power ratings, said ballast incorporating therewith a photo-sensitive element, said ballast controlling lamp switching in accordance with sundown or sunrise, said ballast having a timer that controls the power saver mode in agreement with the time profile before recited, said ballast further containing an ignitor incorporated to the circuit for lamps that require ignition at a voltage higher than the rated voltage.

3. An electronic ballast for high-pressure mercury vapor, metallic vapor and sodium vapor lamps comprising an electonic circuit for producing and obtaining a first or second predetermined frequency substantially higher than a third predetermined frequency associated with that of an electric power distribution network, wherein said third predetermined frequency is 50 Hz or 60 Hz, said ballast further including a current-limiting electronic device, said current-limiting electronic device being responsive to perform electronic switching, said current-limiting electronic device employing an oscillator powered by the electric power network, said oscillator responsive to switching power transistors, wherein the resulting square switched waveform requires a low inductance for current limitation, contrary to the conventional ballasts employing high inductance and low frequency, said ballast having a smaller mass, weight and dimension than that of conventional ballasts, said ballast being a timed electric power saver for the lamps, said ballast being an interchangeable single equipment for utilization with lamps of various power ratings, said ballast incorporating therewith a photo-sensitive element, said ballast controlling lamp switching in accordance with sundown or sunrise, said ballast having a timer controlling the power saver mode conforming to a predetermined time profile, said ballast further containing an ignitor incorporated to the circuit for lamps that require ignition at a voltage higher than the rated voltage.

* * * * *